United States Patent
Justel et al.

(10) Patent No.: US 7,808,170 B2
(45) Date of Patent: Oct. 5, 2010

(54) DEVICE FOR GENERATING UVC RADIATION

(75) Inventors: Thomas Justel, Witten (DE); Jorg Meyer, Aachen (DE); Walter Mayr, Alsdorf (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 304 days.

(21) Appl. No.: 11/911,226

(22) PCT Filed: Apr. 11, 2006

(86) PCT No.: PCT/IB2006/051097

§ 371 (c)(1),
(2), (4) Date: Oct. 11, 2007

(87) PCT Pub. No.: WO2006/109238

PCT Pub. Date: Oct. 19, 2006

(65) Prior Publication Data

US 2008/0258601 A1 Oct. 23, 2008

(30) Foreign Application Priority Data

Apr. 14, 2005 (EP) .................................. 05102948

(51) Int. Cl.
*C09K 11/08* (2006.01)
(52) U.S. Cl. ................................. 313/486; 252/301.4 R
(58) Field of Classification Search .................. 313/486, 313/487, 643; 252/301.4 R, 301.4 P, 301.4 F
See application file for complete search history.

(56) References Cited

U.S. PATENT DOCUMENTS

| 3,825,792 A * | 7/1974 | Rokosz et al. ................ 313/487 |
| 4,171,501 A * | 10/1979 | Tanimizu et al. ............. 313/486 |
| 6,398,970 B1 | 6/2002 | Justel et al. |
| 6,590,333 B1 * | 7/2003 | Suzuki et al. ................ 313/495 |
| 2002/0113542 A1 * | 8/2002 | Bechtel et al. ............... 313/491 |

FOREIGN PATENT DOCUMENTS

| DE | 10209191 A1 | 9/2003 |
| EP | 1048620 A1 | 11/2000 |
| EP | 1271617 A2 | 1/2003 |
| EP | 1521292 A2 | 4/2005 |
| GB | 1200935 A | 8/1970 |
| WO | 03100821 A1 | 12/2003 |

* cited by examiner

*Primary Examiner*—Nimeshkumar D Patel
*Assistant Examiner*—Christopher M Raabe

(57) ABSTRACT

A device for generating ultraviolet radiation by an excimer discharge includes at least partly UV-transparent discharge vessel whose discharge space is filled with a gas filling. The device further includes electrodes for triggering and maintaining an excimer discharge in the discharge space, and a luminescent material that contains a phosphor comprising a host lattice of general formula $(Y_{1-x-y-z},Lu_x,Sc_y,A_z)PO_4$ wherein $0 \leq x<1$ and $0<y \leq 1$ and $0 \leq z<0.05$, where A is an activator selected from the group of bismuth, praseodymium and neodymium.

17 Claims, 10 Drawing Sheets

DEVICE FOR GENERATING UVC RADIATION

BACKGROUND OF THE INVENTION

The invention relates to a device for generating electromagnetic radiation in the ultraviolet range of the electromagnetic spectrum, which device is equipped with an at least partly transparent discharge vessel whose discharge space is filled with a gas filling, with means for triggering and maintaining an excimer discharge in the discharge space, and with a luminescent material that contains a UV-C emitting phosphor.

Radiation sources of this kind are suitable, depending on the spectrum of the radiation emitted, for general and auxiliary lighting, e.g. domestic and office lighting, for the backlighting of displays, e.g. liquid crystal displays, for traffic lights and signal lighting, and for photochemical processes, e.g. sterilization and photolysis.

This invention is particularly concerned with devices useful for disinfection and purification of fluids and surfaces.

There are many known techniques for disinfecting and purification of fluids and surfaces, including the use of chemical or physical agents, mechanical means, and UV radiation. Of these, the traditional method of disinfection has been the use of chemical agents in the form of chlorine. Growing concerns about chlorine's safety and effect on the environment have promoted the evaluation of other disinfection and purification methods.

To date, the most viable alternative to chlorine disinfection is ultraviolet (UV) disinfection. Ultraviolet light has a proven track record of killing bacteria and viruses found in municipal wastewater. Improvements in ultraviolet-lighting technology have led to the development of UV systems that also treat spent metalworking fluids in the industrialized world; disinfect drinking water in developing countries; and clean aquaculture water, ballast water, and hospital air everywhere.

Such UV-emitting devices are known from U.S. Pat. No. 6,398,970, disclosing a device for disinfecting water comprising a gas discharge lamp including a discharge vessel with walls composed of a dielectric material, comprising a first electrode on the outer surface of said walls and a second electrode, said discharge vessel containing a xenon-containing gas filling, wherein the walls are provided, at least on a part of the inner surface, with a coating containing a phosphor emitting in the UV-C range. The phosphor comprises an activator selected from the group consisting of $Pb^{2+}$, $Bi^{3+}$ and $Pr^{3+}$ in a host lattice.

A disadvantage of the known UVC-emitting devices described in U.S. Pat. No. 6,398,970 is that the optical efficiency achieved is not at optimum for germicidal applications, such as disinfection and purification of fluids and surfaces.

It is known, that the efficiency of the UVC emitting devices is both dose related and wavelength dependent.

Ultraviolet light is classified into three wavelength ranges: UV-C, from about 200 nm to about 280 nm; UV-B, from about 280 nm to about 315 nm; and UV-A, from about 315 nm to about 400 nm.

Generally, UV light, and in particular, UV-C light is "germicidal" i.e., it deactivates the DNA of bacteria, viruses and other pathogens and thus destroys their ability to multiply and cause disease, effectively resulting in sterilization of the microorganisms. But the germicidal effect of ultraviolet light, as shown by the germicidal action curve (GAC) in FIG. 17, occurs especially in the wavelength range from 200 to 300 nanometers. UV light with a wavelength $\lambda$ approximately between about 250 to about 260 nm provides the highest germicidal effectiveness.

It was concluded that wavelength was an important consideration in these treatment systems and therefore it is an object of the present invention to provide a device for generating ultraviolet radiation in a wavelength range, that is ideally suited to germicidal processes.

BRIEF DESCRIPTION OF THE INVENTION

In accordance with the invention, this object is achieved by a device for generating ultraviolet radiation by means of an excimer discharge, which device is equipped with an at least partly UV-transparent discharge vessel whose discharge space is filled with a gas filling, with means for triggering and maintaining an excimer discharge in the discharge space, and with a coating that contains a phosphor comprising a host lattice of general formula $(Y_{1-x-y-z},Lu_x,Sc_y,A_z)PO_4$ wherein $0 \leq x < 1$ and $0 < y \leq 1$ and $0 \leq z < 0.05$ and A is A is an activator selected from the group of bismuth, praseodymium and neodymium.

A device of this kind converts the primary radiation generated by the excimer discharge into radiation having a maximum emission at a wavelength of between 225 and 275 nm and a broader bandwidth than the state of the art. UV radiation of this wavelength is particularly effective in photodisinfection because microorganisms show maximum sensitivity in this range.

Radiation in this wavelength range has a high photon energy and breaks even strong chemical bonds such as single C—C or C—O bonds. It is, therefore, also suitable for use in photolytic germicidal processes such as are used for producing very pure water, in the dry cleaning of surfaces, and similar applications.

The further advantages of a device according to the invention can be summarised as follows:
  instant light
  arbitrary design of the lamp
  long lifetime
  low temperature dependence
  spectral power distribution can be optimised to different application areas In one embodiment of the invention, the phosphor contains the activator in an amount of 0.01 to 10 mol %.

It is preferred, that the phosphor has a particle size 1 $\mu m < d_{50} < 6\ \mu m$.

It is preferred for the luminescent material further comprises a phosphor to be selected from the group of $YPO_4$:Nd, $LaPO_4$:Pr, $(Ca,Mg)SO_4$:Pb, $YBO_3$:Pr, $Y_2SiO_5$:Pr, $Y_2Si_2O_7$:Pr, $SrLi_2SiO_4$:Pr,Na, and $CaLi_2SiO_4$:Pr.

It may also be preferred for the phosphor to comprise a coating that contains an oxide selected from the group MgO, $SiO_2$ and $Al_2O_3$.

In one embodiment of the invention, the gas filling contains a gas selected from the group xenon, krypton, argon, neon and helium.

It is particularly preferred for the gas filling to contain xenon. A xenon-excimer discharge shows particularly efficient VUV generation with a maximum at 172±3.5 nm, more than 80% of which is converted by the phosphors activated by bismuth, praseodymium and neodymium into radiation in the wavelength range of 225 to 275 nm.

The electrodes may be composed of a metal or alloy that reflects UV-C light.

Part of the discharge vessel may be provided with a coating that acts as a reflector of VUV and UV-C light.

The invention also relates to a UVC phosphor comprising a host lattice of general formula $(Y_{1-x-y-z},Lu_x,Sc_y,A_z)PO_4$ wherein $0 \leq x < 1$ and $0 < y \leq 1$ and $0 \leq z < 0.05$ and A is an activator selected from the group of bismuth, praseodymium and neodymium.

A UVC-emitting phosphor comprising a host lattice of general formula $(Y_{1-x-y-z},Lu_x,Sc_y,A_z)PO_4$ wherein $0 \leq x < 1$ and $0 < y \leq 1$ and $0 \leq z < 0.05$ and A is an activator selected from the group of bismuth, praseodymium and neodymium is a very bright crystalline phosphor, i.e. this UV-C-emitting phosphor combines a very good absorption in the VUV range and a very high emission quantum yield above 80%. Unlike other phosphors, it is hardly degraded by the VUV radiation.

Such a phosphor is very effective for germicidal action, as the overlap of its emission spectrum with the germicidal action curve (FIG. 17) is more than 66%. This overlap is improved by increasing the width of the emission band, in particular by enhancing the tailing of the low-energy edge. It was found that the addition of small cations like Lu(III) and in particular of Sc(III), to the basic $YPO_4$ host lattice, broadens the emission band and thus improves the overlap with the GAC curve to a substantial amount. In turn, the efficiency of the Sc and/or Lu modified UV-C phosphor is hardly reduced for moderate levels of Y substitution.

The UV-C phosphor according to the invention may comprise additional anions, selected from the group of arsenate and vanadate.

These and other aspects of the invention are apparent from and will be elucidated with reference to the embodiments described hereinafter.

DETAILED DESCRIPTION OF THE INVENTION

The device according to the invention for generating ultraviolet radiation by means of an excimer discharge is equipped with an at least partly UV-transparent discharge vessel whose discharge space is filled with a gas filling, and with a coating of a luminescent material, that comprises a phosphor that contains a host lattice of general formula $(Y_{1-x-y-z},Lu_x,Sc_y,A_z)PO_4$ wherein $0 \leq x < 1$ and $0 < y \leq 1$ and $0 \leq z < 0.05$ and A is an activator selected from the group of bismuth, praseodymium and neodymium. The device is also equipped with means for triggering and maintaining the excimer discharge.

There is a wide variety of possible designs for the discharge vessel such as plates, single tubes, co-axial tubes, and discharge tubes that are straight, U-shaped, curved or coiled in a circle, cylindrical or of other shapes. A typical design for a device for photolytic reactions is that shown in FIGS. 1 and 2. As means for triggering and maintaining the excimer discharge, this design comprises amongst other things electrodes of first and second types. A coiled wire is inserted in the gas-discharge vessel 100 concentrically thereto. This wire forms the first, inner electrode 301 of the device. The outside of the glass is covered with a small-mesh wire mesh that forms the second, outer electrode 302. The discharge vessel is sealed with a gas-tight seal. The space within it is filled with xenon or a gas containing xenon. The two electrodes are connected to the two poles of an a.c. power source. The electrode geometry, together with the pressure in the discharge vessel and the composition of the gas, is matched to the characteristics of the a.c. power source.

Figure 3:
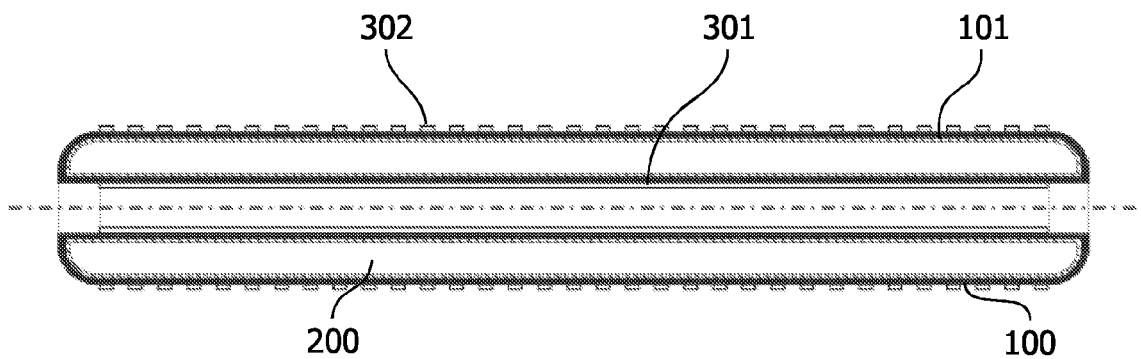
FIG. 3 shows a second design of device for generating ultraviolet radiation, of the co-axial type.
Figure 4:
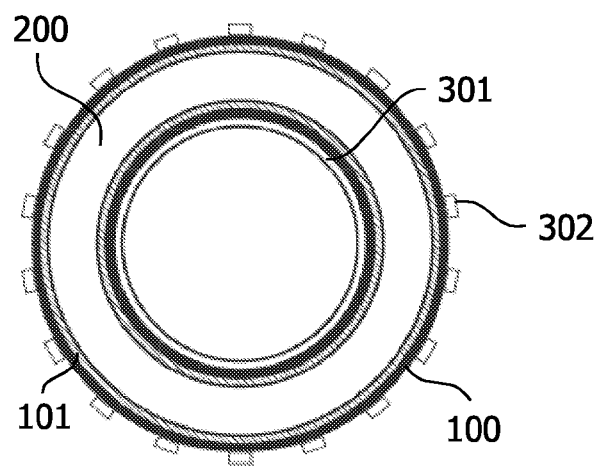
FIG. 4 shows a second design of device for generating ultraviolet radiation, of the co-axial type, in cross-section.

Another typical design for photolytic reactions is the co-axial design through which water or a flow of air flows centrally, which is shown in FIGS. 3 and 4. The discharge vessel 100 comprises two co-axial bodies made of glass that are connected together in a gas-tight manner to form a hollow sleeve. The annular gap between the two co-axial bodies of glass forms the discharge space 200 and is filled with xenon or a gas containing xenon. The fluid medium to be treated may flow through the inner tube, to the inner wall of which a transparent electrode 301 of the first kind is applied. The medium to be treated may also be situated outside the outer tube. The outside of the glass is covered with a small-mesh wire mesh that forms the second, outer electrode 302. The power supply is provided by an a.c. power source connected to these two electrodes.

Figure 5:
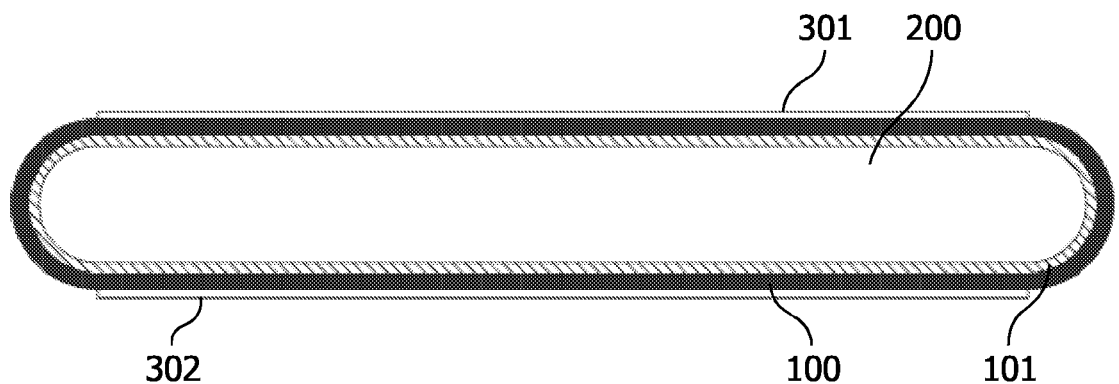
FIG. 5 shows a third design of device for generating ultraviolet radiation, of the tubular type.
Figure 6:
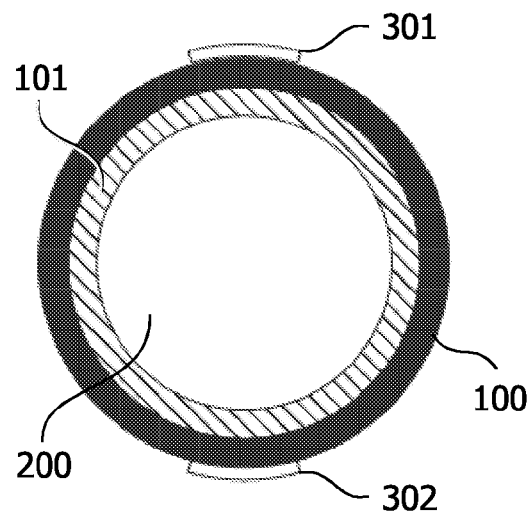
FIG. 6 shows a third design of device for generating ultraviolet radiation, of the tubular type, in cross-section.

Another typical and easily produced design is shown in FIGS. 5 and 6.

Figure 13:
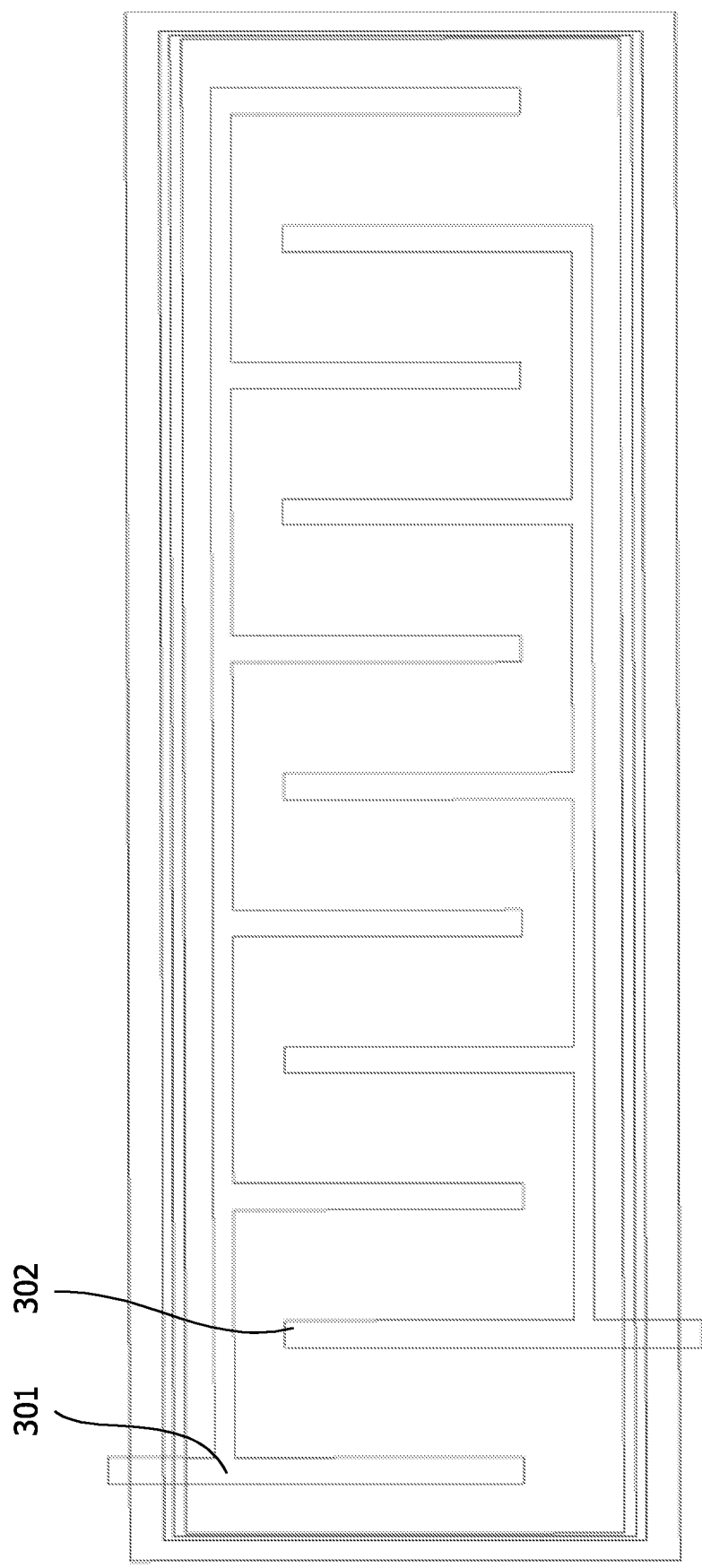
FIG. 13 shows a seventh design of device for generating ultraviolet radiation, in the form of a flat lamp.
Figure 14:
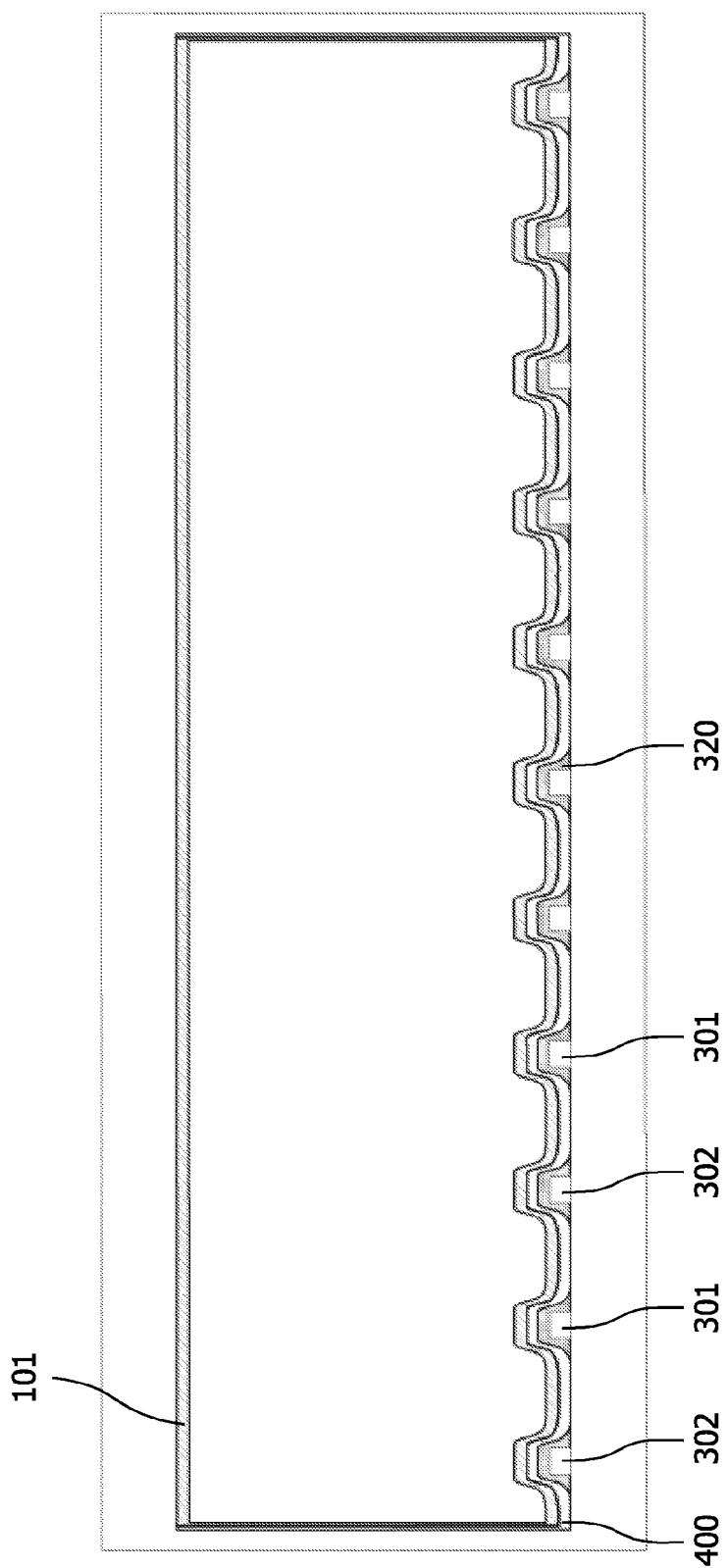
FIG. 14 shows a seventh design of device for generating ultraviolet radiation, in the form of a flat lamp, in cross-section.
Figure 15:
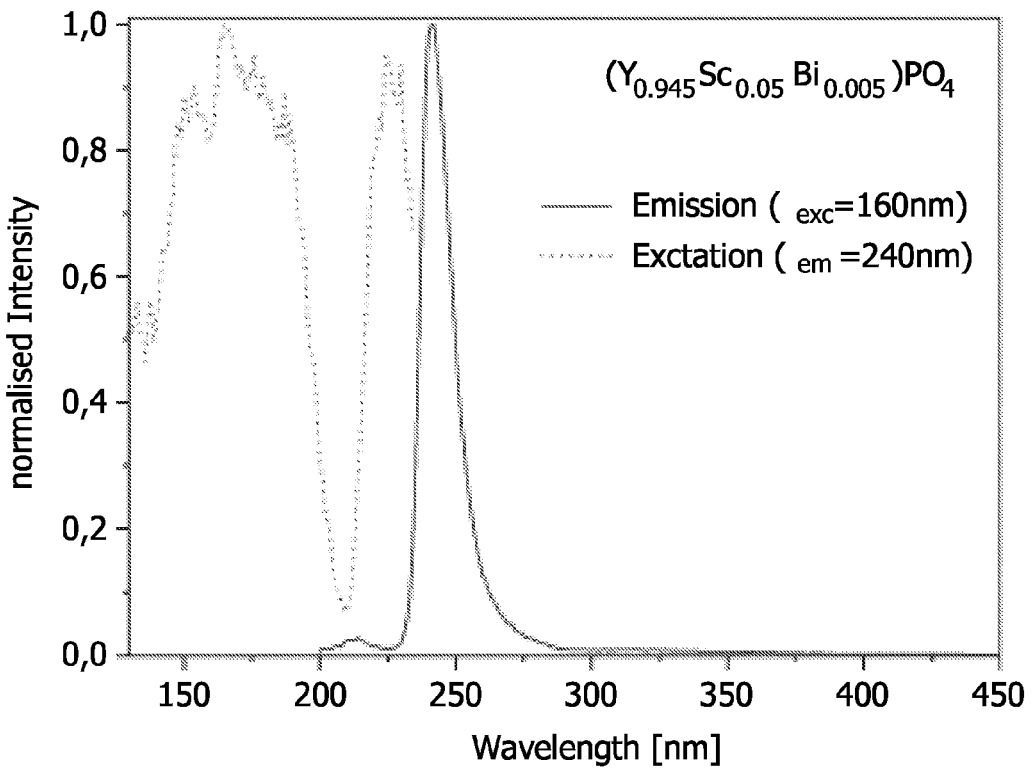
FIG. 15 shows the excitation and emission spectra of $(Y_{0.945}Sc_{0.05})PO_4:Bi_{0.005}$.

The flat design shown in FIGS. 13 and 14 (a "flat lamp") is particularly suitable for the dry cleaning of surfaces and for curing paint finishes.

Figure 7:
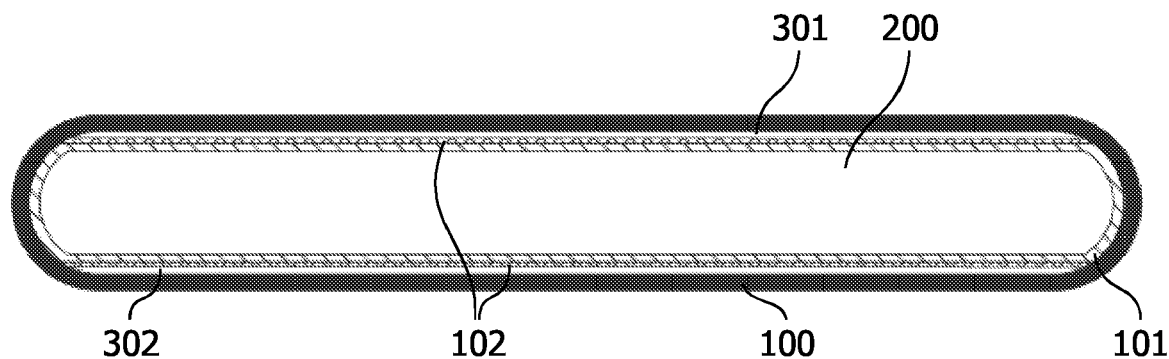
FIG. 7 shows a fourth design of device for generating ultraviolet radiation, having buried electrodes.
Figure 8:
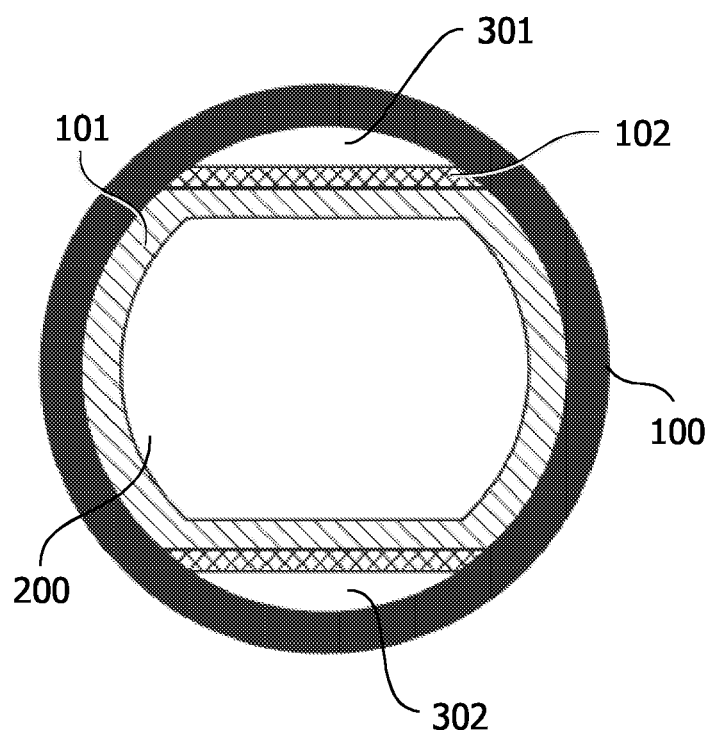
FIG. 8 shows a fourth design of device for generating ultraviolet radiation, having buried electrodes, in cross-section.

In the design shown in FIGS. 7 and 8 the electrodes are mounted on the inside of the wall of the gas-discharge vessel and are separated from the gas discharge space 200 by a covering layer 102 of a dielectric material. This dielectric covering layer 102 preferably comprises glass solder.

The material used for the discharge vessel is preferably quartz or types of glass that are permeable to UV-C and VUV radiation.

The means of triggering and maintaining an excimer discharge comprise electrodes of first and second kinds. In a preferred design, electrodes of the first and second kinds are arranged on the wall of the discharge vessel to generate a dielectrically inhibited discharge, with at least one electrode being separated from the discharge space by a dielectric material. In designs in which at least one electrode is separated from the discharge space by a dielectric barrier, a silent electric discharge is triggered in the filling gas when a suitable a.c. voltage is applied.

Figure 11:
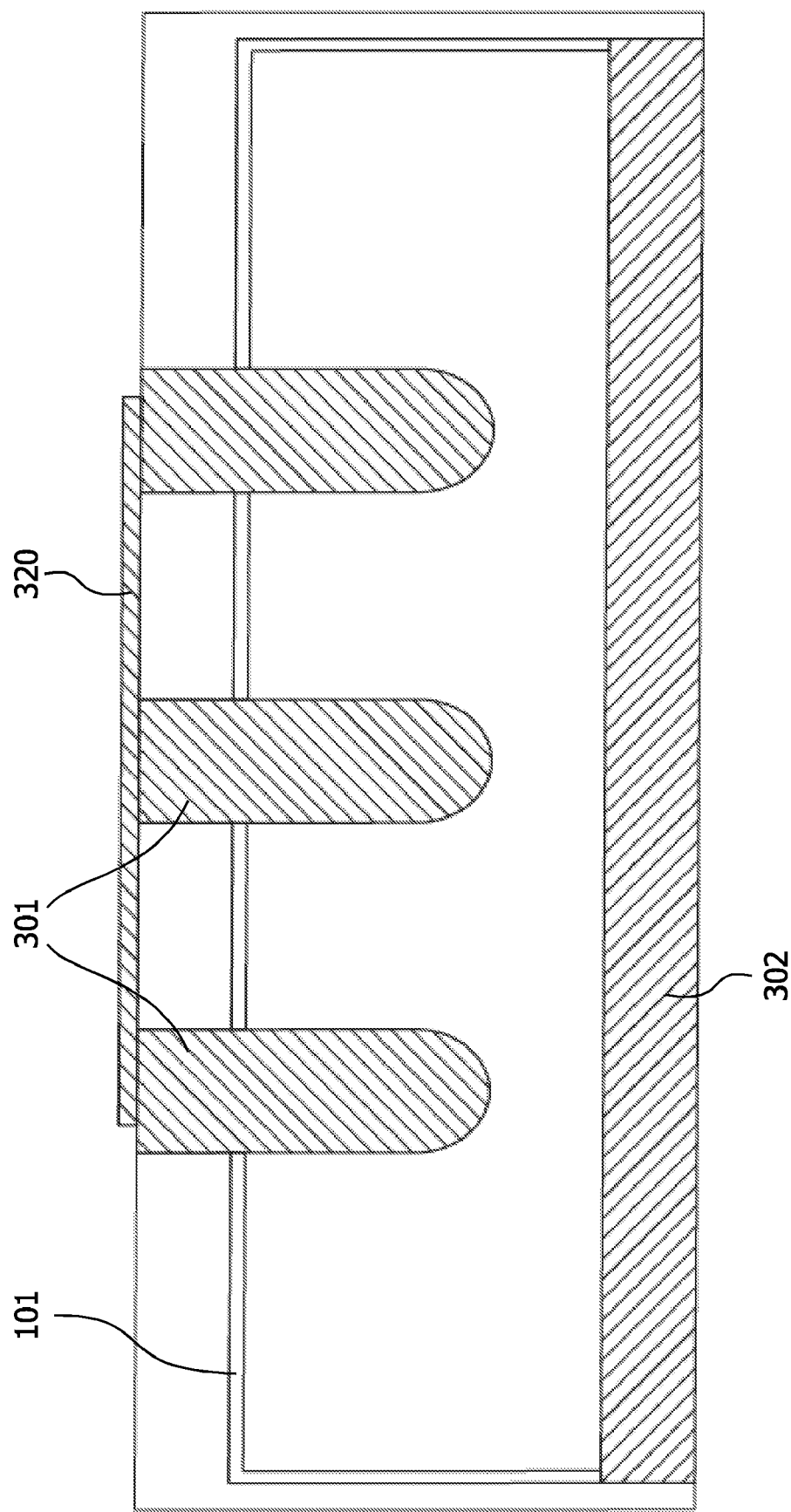
FIG. 11 shows a sixth design of device for generating ultraviolet radiation, employing corona discharge, in cross-section.
Figure 12:
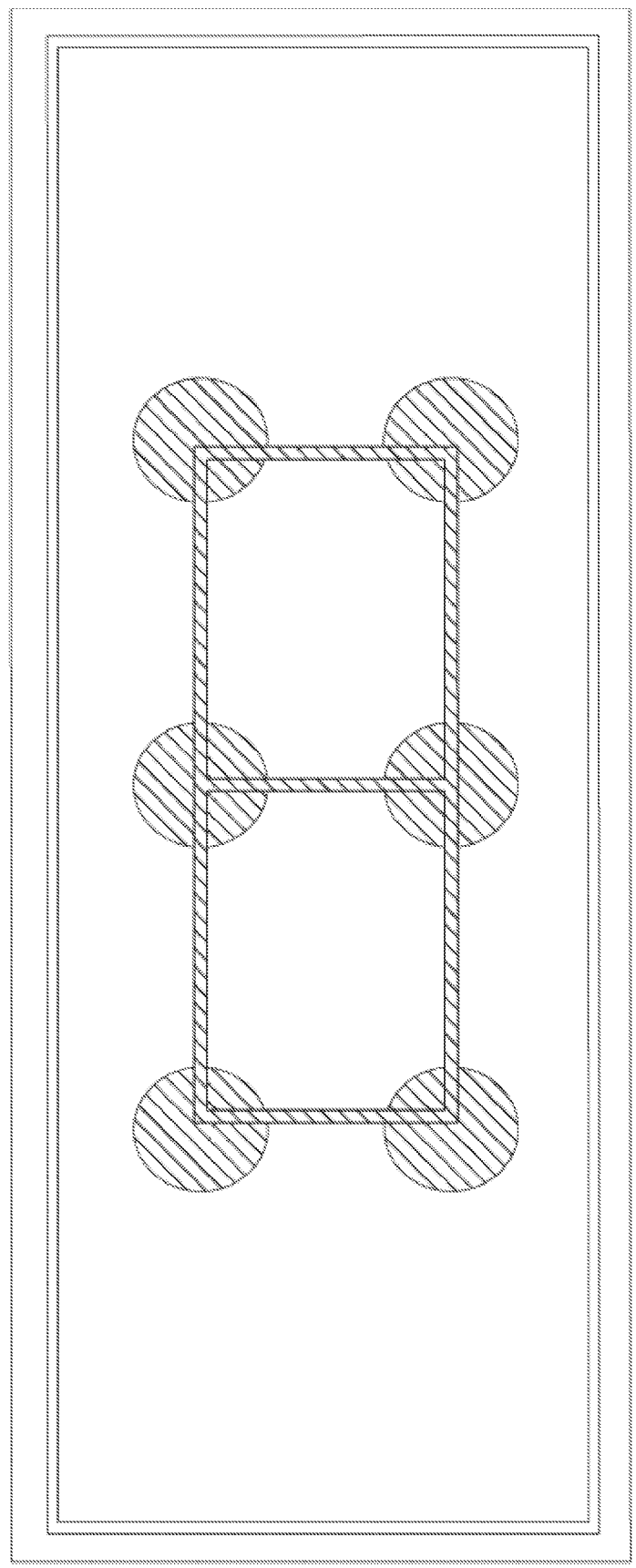
FIG. 12 shows a sixth design of device for generating ultraviolet radiation, employing corona discharge, in plan.

In the designs shown in FIGS. 11 and 12, a discharge of the corona type is triggered in the filling gas when a suitable d.c. or a.c. voltage is applied to the electrodes. In designs that are suitable for a discharge of the corona type, it is not necessary for the electrodes of the first and second types to be separated from the filling gas by a layer of a dielectric material.

In the case of both the silent electrical discharge and the corona discharge, a plasma that contains excimers, i.e. molecules that are only stable in the excited state, forms if there is a suitable gas filling and irrespective of the gas pressure and the electrode geometry.

The electrodes are composed of a metal, e.g. aluminum or silver, a metal alloy, or a transparent conductive inorganic compound, e.g. ITO. They may take the form of a coating, a bonded-on foil, strips of bonded-on foil, a wire or a wire mesh.

It is also possible for a transparent electrolyte, e.g. water, to be used as one of the electrodes. This is particularly advantageous for photolytic processes in water because the radiation is generated in this way in the immediate vicinity of the medium to be irradiated.

In another preferred embodiment, electrodes of first and second kinds are arranged on the wall of the discharge vessel to generate a corona discharge.

Figure 9:
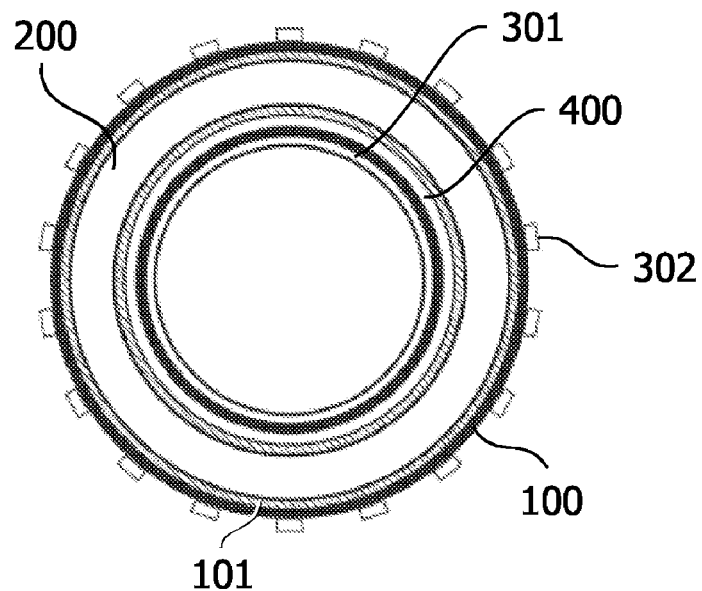
FIG. 9 shows a fifth design of device for generating ultraviolet radiation, having UV reflectors.
Figure 10:
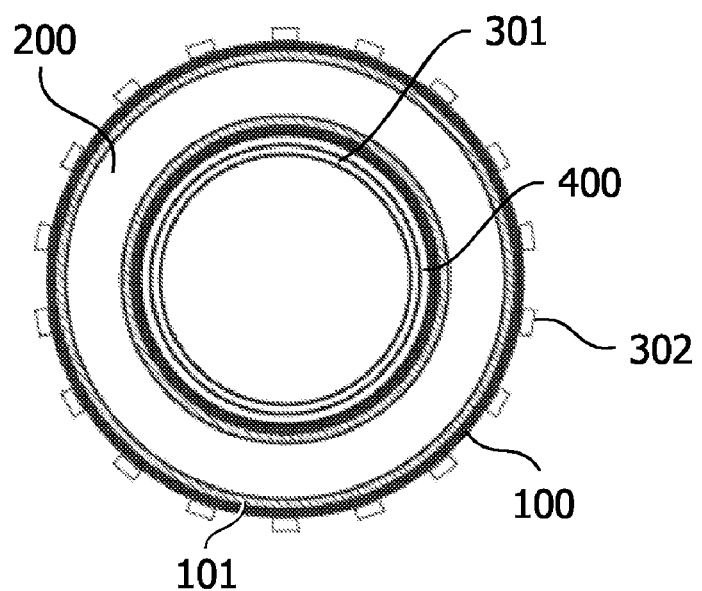
FIG. 10 shows a fifth design of device for generating ultraviolet radiation, having UV reflectors, in cross-section.

To focus the light intensity in a given direction, part of the discharge vessel may be provided with a coating that acts as a reflector 400 of VUV and UV-C light. UV reflectors are preferably used for designs as shown in FIG. 9 or 10 in order to increase the inward or outward radiation by means of a surface.

Metal surfaces, which are provided with a protective layer transparent to UV, where required, are suitable for use as reflectors of radiation in the UV-C or VUV range. An aluminum foil coated with magnesium fluoride is suitable, for example.

Another suitable form of coating that acts as a reflector is a coating that contains particles of a material selected from the group MgO, $SiO_2$, $Al_2O_3$, ZnO and $TiO_2$. There are also certain designs for the electrodes of the first and second types that are of large area and are composed of a metallic material and that act as reflectors of UV-C and VUV radiation. A design of this kind is shown by way of example in FIG. 11.

The discharge vessel is preferably filled with oxygen-free xenon or a mixture of gases that contains xenon, because there is a substantial concentration of the electron energy distribution of an excimer discharge in a xenon-containing atmosphere in the region of the first Xe excitation energy at 8.4 eV and this distribution is thus ideally matched to the formation of $Xe_2$ excimers and, as a result of the emission of the latter in the wavelength range between 160 and 190 nm, to the excitation of phosphors containing bismuth, praseodymium or neodymium as activators.

The inner wall of the discharge vessel is wholly or partly covered with a coating 101 of a luminescent material that contains the phosphor according to the invention. The coating may also contain an organic or inorganic binder or binder composition. Furthermore, the phosphor layer may be protected against attack by the discharge by means of a protective layer.

According to the invention luminescent materials for germicidal purposes comprising a UVC phosphor comprising a host lattice of general formula $(Y_{1-x-y-z},Lu_x,Sc_y,A_z)PO_4$ wherein $0\leq x<1$ and $0<y\leq 1$ and $0\leq z<0.05$ and A is an activator selected from the group of bismuth, praseodymium and neodymium are provided.

This class of phosphor material is based on the activated luminescence of a ternary rare earth metal orthophosphate, a crystalline solid composed of a host lattice of yttrium lutetium scandium orthophosphate that is activated with a small amount of dopants selected from bismuth, praseodymium and neodymium.

The host lattice will form a crystal structure of the xenotime type. The xenotime crystal structure belongs to a group of phosphates, called informally the anhydrous phosphates along with monazite, purpurite and lithiophyllite. Also of note is that xenotime is one of the few phosphate minerals that do not contain water molecules, hydroxides or chlorides.

The structure may contain minor amounts of vanadate and arsenate replacing the phosphate anion. In fact it forms a solid solution series with these anions. It is unusual to have a solid solution series involving the principle anions but it is not a complete solid solution series.

It may further comprise impurities traces, e.g. Ti; Er; La, Al; Si, Zr.

Crystallographic properties of xenotime

| Crystal System: | Tetragonal |
| --- | --- |
| Class (H-M): | 4/m-Dipyramidal |
| Space Group: | $I4_1/a$ |

The host lattice exerts a weak ligand field. This means, that in the host lattice the optical band gap is above the low-energy limit of the energy spectrum of the VUV radiation, and in particular above 6.7 eV. Therefore the phosphors can be efficiently excited by VUV radiation.

The host lattice is doped with at least one substance, which functions as a locus of luminescence and is conventionally called an activator. By a suitable choice of the activator, the optical spectrum can be influenced in a targeted way.

According to the invention activators having a large energy splitting between the ground state and the first excited state in these lattices, i.e. $Bi^{3+}$, $Pr^{3+}$, and $Nd^{3+}$ are used.

Bismuth, praseodymium and neodymium are excellent activators for this type of host lattice, because both their ground state and excited states lie within the band gap of about 6 eV of the host lattice. These activators generally show wide absorption bands in the vacuum ultraviolet (VUV).

The emission spectra of the UV-C phosphors according to the invention resemble that known of $YPO_4$:Bi, which exhibits an emission band due to the 5d4f transitions of the activators at 225 to 275 nm. However it was found that the addition of small cations, such as $Lu^{3+}$ and in particular of $Sc^{3+}$, to the basic $YPO_4$ host lattice, broadens the emission band, enhances the relative amount of emission with longer wavelength in the emission spectrum and thus improves the overlap with the GAC curve to a substantial amount. The broadening of the bandwidth by incorporation of smaller isoelectronic cations is thought to be caused by the nephelauxetic effect of doping of the basic host lattice by smaller cations Nevertheless, the efficiency of the UV-C phosphor is hardly reduced for moderate doping levels.

The following table summarizes the emission band position and the overlap with the GAC curve:

TABLE 1

Specifications of Xe discharge lamps comprising a phosphor according to the composition $(Y_{1-y}Sc_y)PO_4$:Bi as a luminescent layer in comparison to prior art $YPO_4$:Bi.

| Phosphor | Emission band position [nm] | Overlap with GAC curve [%] |
|---|---|---|
| $YPO_4$:Bi (Prior Art) | 240 | 66.3 |
| $(Y_{0.99}Sc_{0.01})PO_4$:Bi | 241 | 69.3 |
| $(Y_{0.97}Sc_{0.03})PO_4$:Bi | 241 | 70.1 |
| $(Y_{0.95}Sc_{0.05})PO_4$:Bi | 241 | 69.1 |
| $(Y_{0.9}Sc_{0.1})PO_4$:Bi | 242 | 69.1 |
| $(Y_{0.8}Sc_{0.2})PO_4$:Bi | 241 | 69.3 |
| $(Y_{0.7}Sc_{0.3})PO_4$:Bi | 241 | 69.4 |

Although $YPO_4$:Bi is a very efficient luminescent material, its overlap with the GAC curve is less than 67% due to the position of the emission band at around 241 nm, which is thus at too high energy for a perfect match to the GAC curve. This overlap can be improved either by a shift of the emission band towards lower energy or by increasing the width of the emission band, in particular by enhancing the tailing of the low-energy edge as provided by the invention.

The phosphors are produced by a solid-state reaction from the starting compounds, in the form of fine-grained powders having a preferred grain-size distribution of mean mass diameter $d_{50}$ between 1 and 6 μm. Mean mass diameter $d_{50}$ is defined as the diameter at which 50% of the particles, by mass, have a smaller diameter, while 50% by mass have a larger diameter.

The phosphor powders are applied to the walls of the discharge vessel by a flow coating process. The coating suspensions for the flow coating process contain water or an organic compound such as butyl acetate as a solvent. The suspension is stabilized, and its Theological properties acted on, by adding aids such as stabilizers, liquefiers and cellulose derivatives. The phosphor suspension is applied to the walls of the vessel as a thin film, dried and fired on at 600° C. The vessel is then evacuated to remove all gaseous contaminants and particularly oxygen. The vessel is then filled with xenon at a pressure of approximately 200 to 300 mbar and sealed.

SPECIFIC EMBODIMENT 1

Synthesis of $(Y_{0.945}Sc_{0.05})PO_4$:$Bi_{0.005}$ 20 g $Y_2O_3$, 0.64463 g $Sc_2O_3$ and 0.2184 g $Bi_2O_3$ are made into a water-based suspension. Slowly 22.692 g $H_3PO_4$ (85%) are added and the mixture is stirred for 24 h at room temperature. The solvent is removed using a rotary evaporator and the solid remains are dried at 100° C. 0.400 g LiF are added while grinding the powder in a mortar. Calcination is carried out using the following heating profile: heat up to 800° C. in 2 h, hold for 2 h, heat up to 1000° C. in 2 h, hold for 2 h and finally cool down to room temperature in 4 h. The resulting product is ground again using an agate mortar. Thereafter it is washed for 6 h at 60° C. using a solution of 140 ml $HNO_3$ in 600 ml water. The powder is isolated by suction filtration, washed with water to remove the acid and dried at 100° C. The phosphor is then milled and after milling it is calcined again in air for 2 h at 900° C. in an open crucible. To remove excess bismuth from the particle surfaces the phosphor is washed with 500 ml of 0.1 molar EDTA solution for 2 h. It is then collected on a filter, washed with water and finally dried at 100° C.

Figure 16:
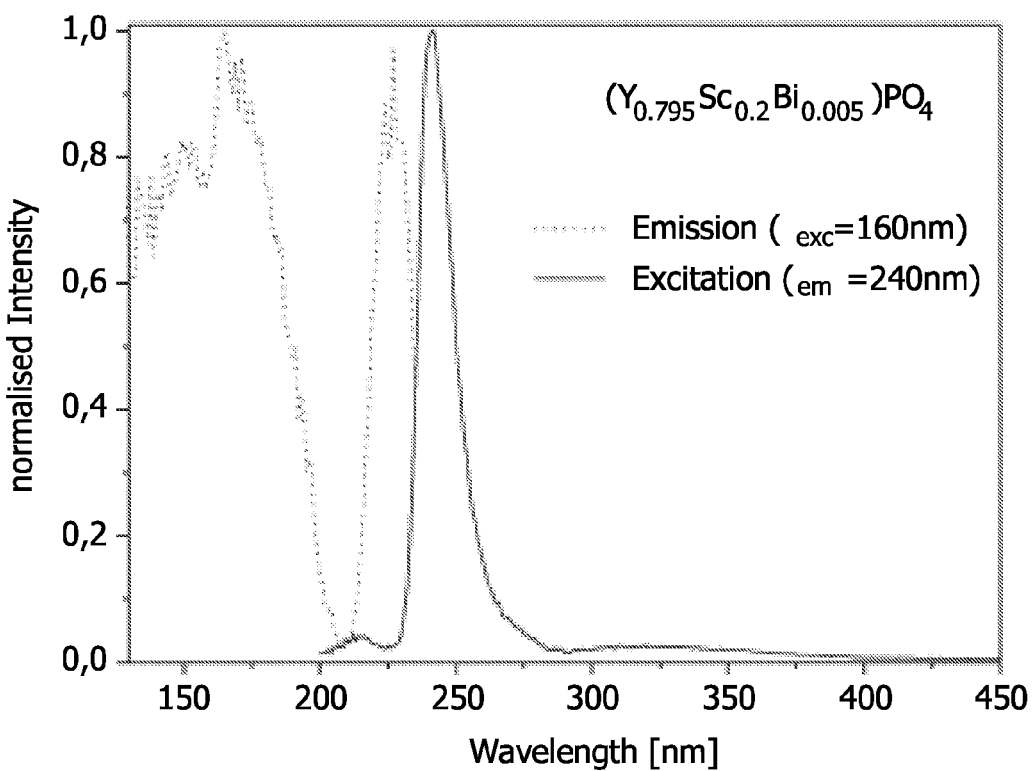
FIG. 16 shows the excitation and emission spectra of $(Y_{0.795}Sc_{0.2})PO_4:Bi_{0.005}$.

Excitation and emission spectra of $(Y_{0.945}Sc_{0.05})PO_4$:$Bi_{0.005}$ are given in FIG. 16. Xe Excimer Lamp Manufacture A suspension of $(Y_{0.945}Sc_{0.05})PO_4$:$Bi_{0.005}$ in butyl acetate with nitrocellulose as a binder is produced. The phosphor suspension is applied to the inner wall of a tube of synthetic quartz (Suprasil™) with an inside diameter of 5 mm by a flow coating process. The thickness of the phosphor layer corresponds to a weight per unit area for the phosphor of 3 mg/cm³. The binder is burnt off at a temperature below 580° C. The device is filled with xenon at a pressure of 200 to 300 mbar and then sealed. Any contamination by oxygen must be carefully avoided. Two electrodes of aluminum foil are bonded diagonally to the outer wall of the device.

SPECIFIC EMBODIMENT 2

Synthesis of $(Y_{0.795}Sc_{0.2})PO_4$:$Bi_{0.005}$ 17,952 g $Y_2O_3$, 2.7582 g $Sc_2O_3$ and 0.233 g $Bi_2O_3$ are made into a water-based suspension. Slowly 24.212 g $H_3PO_4$ (85%) are added and the mixture is stirred for 24 h at room temperature. The solvent is removed using a rotary evaporator and the solid remains are dried at 100° C. 0.400 g LiF are added while grinding the powder in a mortar. Calcination is carried out using the following heating profile: heat up to 800° C. in 2 h, hold for 2 h, heat up to 1000° C. in 2 h, hold for 2 h and finally cool down to room temperature in 4 h. The resulting product is ground again using an agate mortar. Thereafter it is washed for 6 h at 60° C. using a solution of 140 ml $HNO_3$ in 600 ml water. The powder is isolated by suction filtration, washed with water to remove the acid and dried at 100° C. The phosphor is then milled and after milling it is calcined again in air for 2 h at 900° C. in an open crucible. To remove excess bismuth from the particle surfaces the phosphor is washed with 500 ml of 0.1 molar EDTA solution for 2 h. It is then collected on a filter, washed with water and finally dried at 100° C.

Figure 17:
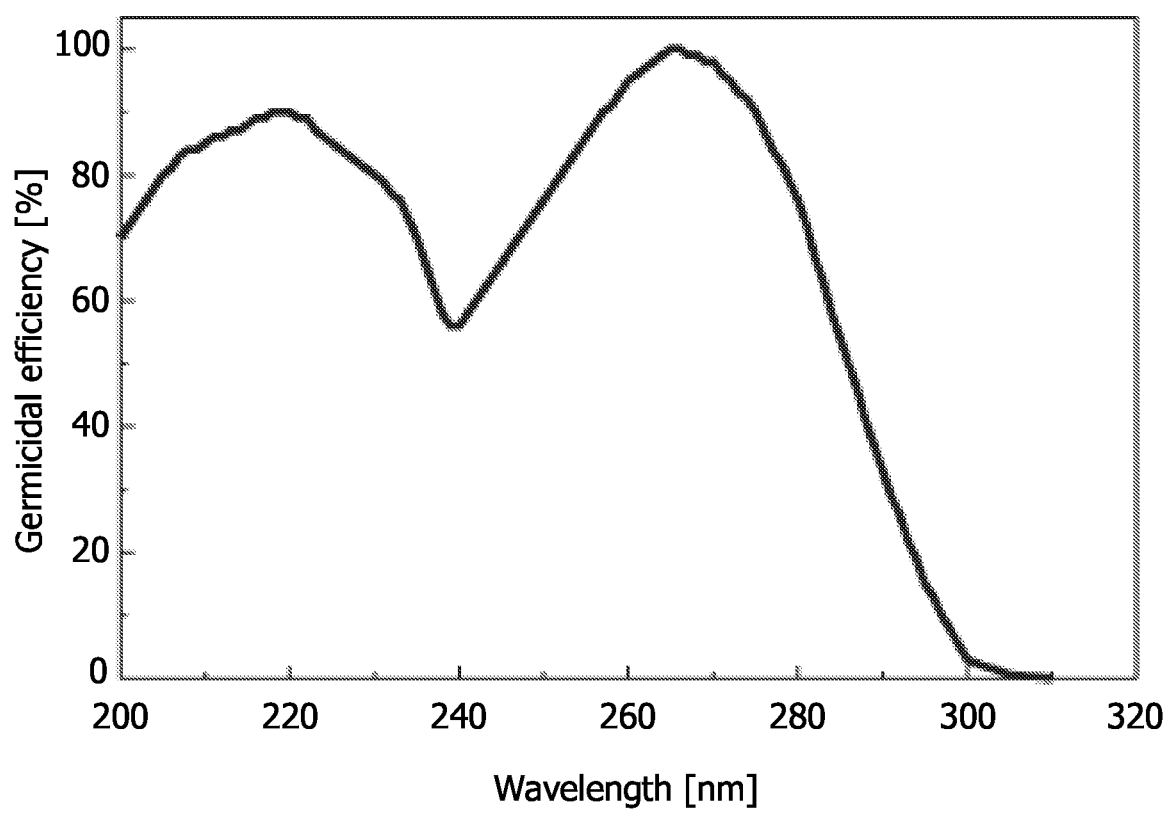
FIG. 17 shows the germicidal action curve (GAC) illustrating the relative effectiveness as a function of the UV light wavelength for germicidal action in general.

Excitation and emission spectra of $(Y_{0.795}Sc_{0.2})PO_4$:$Bi_{0.005}$ are given in FIG. 17.

Xe Excimer Lamp Manufacture

A suspension of $(Y_{0.795}Sc_{0.2})PO_4$:$Bi_{0.005}$ in butyl acetate with nitrocellulose as a binder is produced. The phosphor suspension is applied to the inner wall of a tube of synthetic quartz (Suprasil™) with an inside diameter of 5 mm by a flow coating process. The thickness of the phosphor layer corresponds to a weight per unit area for the phosphor of 3 mg/cm³. The binder is burnt off at a temperature below 580° C. The device is filled with xenon at a pressure of 200 to 300 mbar and then sealed. Any contamination by oxygen must be carefully avoided. Two electrodes of aluminum foil are bonded diagonally to the outer wall of the device.

The device is operated by a.c. current having a square-wave characteristic, amplitude of 6 kV and a frequency of 25 kHz.

In operation, if an a.c. voltage is applied to the electrodes, a silent electrical discharge is triggered in the filling gas, which is preferably xenon-containing. As a result, xenon excimers, i.e. molecules that are only stable in the excited state, form in the plasma. Xe+Xe*=$Xe_2$*.

The excitation energy is emitted again as VUV radiation at a wavelength of λ=140 to 190 nm. This conversion of electron energy into VUV radiation is performed with great efficiency. The VUV photons generated are absorbed by the phosphors and the excitation energy is emitted again partly in the longer wavelength range of the spectrum. The absorption coefficient of the phosphors activated with Bi(III), Nd(III) or Pr(III) is particularly high for wavelengths in the xenon-radiation range and the quantum yield is high. The host lattice does not take part in the luminescence process other than host lattice absorption and energy transfer to the activator, however, it does influence the exact position of the energy levels of the activator ion and hence the absorption and emission wavelengths.

The devices described are also highly suitable for high-yield photolytic reactors. Because the spectrum of the radiation emitted is confined to a narrow band, the device according to the invention may advantageously be employed to carry out wavelength-selective photoreactions.

Table 1 shows the absorption edges of certain widely used solvents

TABLE 1

| Solvent | Absorption edge [nm] |
|---|---|
| Isopropyl alcohol | 210 |
| Cyclohexane | 210 |
| Methyl cyclohexane | 210 |
| Ethanol | 210 |
| Methanol | 210 |
| Acetonitrile | 210 |
| 2,2,4-trimethyl pentane | 220 |
| Iso-octane | 220 |
| Hexane | 220 |
| Dioxane | 220 |
| Glycerol | 230 |
| Dichloromethane | 235 |
| 1,2-dichloroethane | 240 |
| Chloroform | 250 |

Industrial photochemical processes (e.g. photo-chlorination, photo-bromination, photo-sulfochlorination) can also be carried out more efficiently with the device according to the invention.

Further uses for the device according to the invention have to do with water and wastewater technology where polluted water is the fluid to be treated. Examples of treatment of this kind that may be mentioned are a) disinfection b) breakdown of pollutants and dyes and removal of odor.

The device according to the invention may also be used for sterilizing other liquids and solvents.

Figure 1:
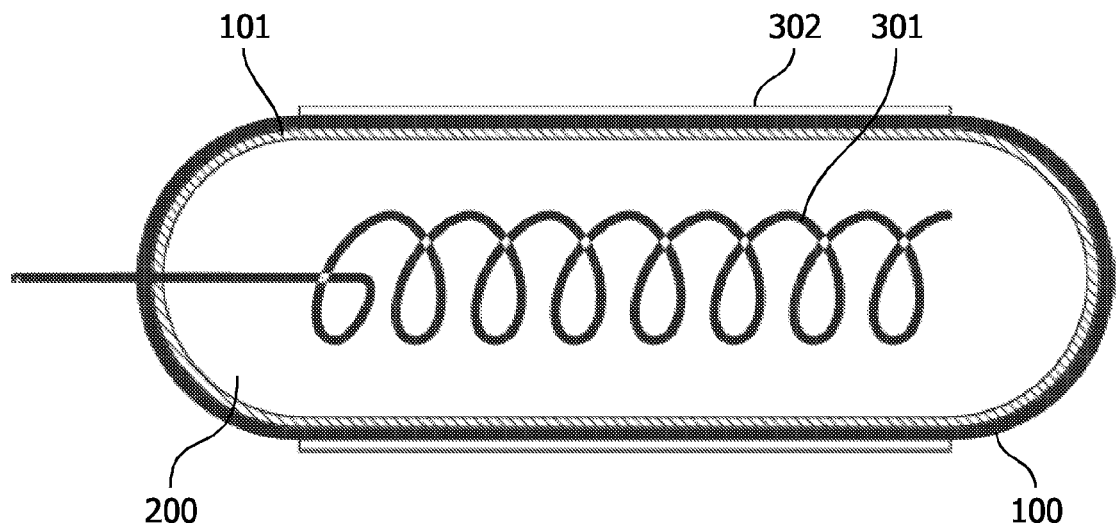
FIG. 1 shows a first design of device for generating ultraviolet radiation, having a concentric electrode.
Figure 2:
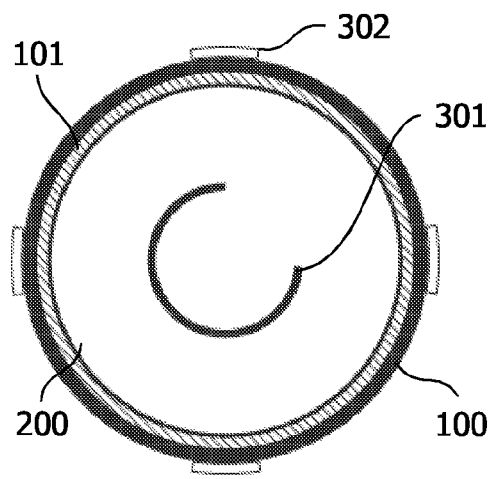
FIG. 2 shows a first design of device for generating ultraviolet radiation, having a concentric electrode, in cross-section.

In the case of the design shown in FIGS. 1 and 2, the medium to be treated may be conducted past the outside face of the radiant source. In a further application, this design may, for example, be used for the cleaning of surfaces in the dry state.

In the case of the design shown in FIGS. 3 and 4, the reacting medium may be conducted past the inner and/or outer face of the radiant source. To make it possible for irradiation to take place at the inner face, the electrode adjacent the axis of the lamp must be transparent or perforated. This design can be used to destroy solvent residues in water or air or other gases.

The invention claimed is:

1. A device for generating ultraviolet radiation by an excimer discharge, the device comprising:
   at least partly UV-transparent discharge vessel having a discharge space filled with a gas filling,
   electrodes for triggering and maintaining an excimer discharge in the discharge space, and
   a coating that contains a phosphor comprising a host lattice of general formula $(Y_{1-x-y-z},Lu_x,Sc_y,A_z)PO_4$ wherein $0 \leq x < 1$ and $0 < y \leq 1$ and $0 < z < 0.05$, and A is an activator selected from the group of bismuth, praseodymium and neodymium.

2. The device for generating ultraviolet radiation as claimed in claim 1, wherein the phosphor contains the activator in an amount of 0.01 to 10 mol %.

3. The device for generating ultraviolet radiation as claimed in claim 1, wherein the phosphor has a particle size 1 $\mu m < d_{50} < 6$ $\mu m$.

4. The device for generating ultraviolet radiation as claimed in claim 1, wherein the luminescent material further comprises a phosphor to be selected from the group of $YPO_4$:Nd, $LaPO_4$:Pr, $(Ca,Mg)SO_4$:Pb, $YBO_3$:Pr, $Y_2SiO_5$:Pr, $Y_2Si_2O_7$:Pr, $SrLi_2SiO_4$:Pr,Na, and $CaLi_2SiO_4$:Pr.

5. The device for generating ultraviolet radiation as claimed in claim 1, wherein the phosphor comprises a coating that contains an oxide selected from the group MgO, $SiO_2$ and $Al_2O_3$.

6. The device for generating ultraviolet radiation as claimed in claim 1, wherein the gas filling contains a gas selected from the group xenon, krypton, argon, neon and helium.

7. The device for generating ultraviolet radiation as claimed in claim 1, wherein the gas filling contains xenon.

8. The device for generating ultraviolet radiation as claimed in claim 1, wherein the electrodes are composed of a metal or alloy that reflects UV-C light.

9. The device for generating ultraviolet radiation as claimed in claim 1, wherein part of the discharge vessel is provided with a coating that acts as a reflector of VUV and/or UV-C light.

10. A phosphor comprising a host lattice of general formula $(Y_{1-x-y-z}, Lu_x,Sc_y,A_z)PO_4$ wherein $0 \leq x < 1$ and $0 < y \leq 1$ and $0 < z < 0.05$, and A is an activator selected from the group of bismuth, praseodymium and neodymium.

11. The phosphor according to claim 10, further comprising an anion, selected from the group of arsenate and vanadate.

12. The device of claim 1, further comprising an anion comprising arsenate.

13. The device of claim 1, wherein the phosphor comprises $(Y_{0.945}SC_{0.05})PO_4$:$Bi_{0.005}$.

14. The device of claim 1, wherein the phosphor comprises $(Y_{0.795}SC_{0.2})PO_4$:$Bi_{0.005}$.

15. The phosphor of claim 10, further comprising an anion comprising arsenate.

16. The phosphor of claim 10, wherein the phosphor comprises $(Y_{0.945}SC_{0.05})PO_4$:$Bi_{0.005}$.

17. The phosphor of claim 10, wherein the phosphor comprises $(Y_{0.795}SC_{0.2})PO_4$:$Bi0.005$.

* * * * *